United States Patent
Forsberg

(10) Patent No.: US 7,212,740 B2
(45) Date of Patent: *May 1, 2007

(54) TRANSMITTER-RECEIVER DEVICE AND A COMMUNICATION SYSTEM

(75) Inventor: Gunnar Forsberg, Stockholm (SE)

(73) Assignee: Transmode Systems AB (SE)

( * ) Notice: Subject to any disclaimer, the term of this patent is extended or adjusted under 35 U.S.C. 154(b) by 634 days.

This patent is subject to a terminal disclaimer.

(21) Appl. No.: 10/433,086

(22) PCT Filed: Nov. 27, 2001

(86) PCT No.: PCT/SE01/02624

§ 371 (c)(1),
(2), (4) Date: May 30, 2003

(87) PCT Pub. No.: WO02/45300

PCT Pub. Date: Jun. 6, 2002

(65) Prior Publication Data

US 2004/0017959 A1 Jan. 29, 2004

(30) Foreign Application Priority Data

Dec. 1, 2000 (SE) .................................. 0004435

(51) Int. Cl.
*H04B 10/08* (2006.01)
*H04B 10/00* (2006.01)

(52) U.S. Cl. ............................ 398/15; 398/17; 398/22; 398/31; 398/32; 398/33; 398/151

(58) Field of Classification Search ................. 398/141, 398/182, 192, 194, 15–17, 20–22, 30–34, 398/163, 151, 162
See application file for complete search history.

(56) References Cited

U.S. PATENT DOCUMENTS

| | | | |
|---|---|---|---|
| 5,136,410 A | 8/1992 | Heiling et al. | |
| 5,339,454 A | 8/1994 | Kuo et al. | |
| 5,917,639 A | 6/1999 | Ushirozawa | |
| 5,956,168 A | 9/1999 | Levinson et al. | |
| 6,049,175 A | 4/2000 | Forsberg | |
| 6,055,094 A | 4/2000 | Shima et al. | |
| 2004/0028313 A1* | 2/2004 | Forsberg | 385/14 |
| 2004/0047554 A1* | 3/2004 | Forsberg | 385/31 |

FOREIGN PATENT DOCUMENTS

EP 0542480 5/1993

(Continued)

*Primary Examiner*—Dalzid Singh
(74) *Attorney, Agent, or Firm*—Bingham McCutchen LLP

(57) ABSTRACT

The invention concerns a transmitter-receiver device (A, B) which comprises a receiver unit (RXA) for receiving optical signals and transmitter unit (TXA) for transmitting optical signals. Furthermore, the transmitter-receiver device (A, B) comprises a supervising unit (CUA) which supervises the functions of the receiver unit (RXA) and the transmitter unit (TXA). Furthermore, the transmitter-receiver device (A, B) comprises a transmitter circuit which transmits optical communication signals in response to a balanced electric input signal. The invention also concerns a communication system comprising two transmitter-receiver devices (A, B). Through the structure of the invention is by relatively simple means a well functioning device achieved, which, inter alia, makes it possible to supervise the status of the two transmitter-receiver devices (A, B) in an advantageous manner.

20 Claims, 8 Drawing Sheets

FOREIGN PATENT DOCUMENTS

| | | |
|---|---|---|
| EP | 0903875 | 3/1999 |
| GB | 2234408 A * | 1/1991 |
| JP | 09093204 | 4/1997 |
| JP | 09172330 | 6/1997 |
| JP | 09298426 | 11/1997 |
| JP | 10284955 | 10/1998 |
| WO | 99/28768 | 6/1999 |

* cited by examiner

TRANSMITTER-RECEIVER DEVICE AND A COMMUNICATION SYSTEM

BACKGROUND OF THE INVENTION AND PRIOR ART

The present invention concerns a transmitter-receiver device which may be used to transfer information optically. Such a transmitter-receiver device may form part of a communication system for bi-directional transfer of optical signals. The invention also concerns such a communication system.

FIG. 1 shows schematically an example of a bi-directional communication system according to the prior art for transferring optical signals. The system comprises a first transmitter-receiver device A with a receiver unit RXA and a transmitter unit TXA. The transmitter-receiver device A communicates with a similar transmitter receiver device B. Also the transmitter-receiver device B thus comprises a transmitter unit TXB and a receiver unit RXB. The transmitter unit TXB transmits optical signals over a first optical fibre F1 to the receiver unit RXA. In a similar manner, the transmitter unit TXA transmits optical signals over a second optical fibre F2 to the receiver unit RXB. In such a system, the light that is transmitted from the respective transmitter unit TXA, TXB often has an essentially constant average power, i.e. light is normally transmitted all the time. The information transfer is carried out through a suitable modulation of this light signal.

The receiver units RXA, RXB may have an output, UA, UB, respectively, which for example may assume two logical values depending on if the optical power received in the receiver unit RXA, RXB exceeds a certain value. This output UA, UB may for example be connected to an indicator IA, IB, for example in the form of a light emitting diode. Such an indicator IA, IB may for example emit light if the respective receiver unit RXA, RXB receives light. In such a manner, the respective indicator IA, IB may indicate that the connection over the fibre F1, F2 works. The signal from the output UA or UB may also be connected to a network management system NMS. Such a network management system NMS supervises the communication system and makes it possible to, from a completely different position than where the transmitter-receiver devices A and B are located, supervise whether the bi-directional communication system works. The lines 131, 133, 135, and 137 are intended to transfer information carrying signals, for example as electric signals, to and from the transmitter and receiver units RXA, TXA, TXB, and RXB.

In the system according to FIG. 1, for example the transmitter-receiver device B may be arranged in a home and the second transmitter-receiver device A may constitute a centrally located device which transmits signals to the home and receives signals from the home. In order to supervise the system it is desirable to connect the device B to the network management system NMS. If, for example, the device B is positioned in a home or in an office, this device often has no other connection out from the home or the office than via the optical fibres F1 and F2. It is actually conceivable to connect the device B to a network management system via the fibre F1. However, it is relatively expensive and complicated to, in addition to the normal information signals, also transmit signals concerning the network management on the same fibre F1. Furthermore, this network management does not work in case of a breakage of the fibre F1. Since the network management system NMS is intended to supervise the function of the network, it is desirable that this supervision works also in case an error occurs in the communication between the devices A and B. It is, of course, conceivable that the network management system NMS may supervise the device B via another line than via F1 or F2, for example in the home there may be a telephone modem, over which this supervision takes place. This constitutes, however, a complicated solution for transferring signals to the network management system NMS. It is, of course, also possible that a person goes to the device B in order to personally check if, for example, the indicator IB is lit. This may possibly be acceptable within, for example, an office where the distance to B may be short. However, it becomes much more complicated to send a person to the device B if this device is located at a long distance from the position where the person normally is.

As a background to the present invention, also so-called eye-safe fibre communication systems should be mentioned. A problem with fibre communication systems is that the light intensity which is transmitted over the fibres may be relatively high. If, for example, a fibre is broken and if somebody looks into the fibre, damages of the eye might occur. If a fibre is broken or damaged, it is therefore desirable to cut off the light signal which is transmitted over this fibre. For example U.S. Pat. No. 5,136,410 describes such a system.

With reference to FIG. 1 it will now briefly be described how an eye-safe system may work. Suppose that a breakage takes place of the fibre F1. The output UA thereby indicates that no light is received in the receiver unit RXA. A supervising unit (not shown in FIG. 1) may then cut off the transmission of light from the transmitter unit TXA. At the receiver unit RXB it is thereby detected that no light is received. Another supervising unit in connection to the device B thereby immediately cuts off the transmission of light from the transmitter unit TXB. Thereby, no harmful light exists on the broken fibre F1. In order to check if the connection via the fibre F1 works again, the respective transmitter unit TXA, TXB often transmits short light pulses at regular intervals. These light pulses are so short that they are not harmful to the eye. When one receiver unit RXB receives such a light pulse, a similar light pulse is immediately transmitted by the transmitter unit TXB. As long as the breakage of the fibre F1 is the case, the receiver unit RXA does not detect any such light pulse. If, however, the fibre F1 works again, the receiver unit RXA will detect such a response pulse from TXB immediately after TXA having transmitted a pulse to RXB. The connection thus works again and the respective transmitter unit TXA, TXB may now continuously transmit light. The time between the light pulses in such a safety system is usually quite long, for example U.S. Pat. No. 5,136,410 mentions that the time between these pulses is about 49 seconds.

The line 133 (and 135) shown in FIG. 1 may constitute a pair of conductors on which a balanced electric signal is present.

The transmitter unit TXA (and TXB) therefore normally has a transmitter circuit comprising a light source and arranged to operate said light source to transmit optical communication signals in response to electric input signals from a first and second circuit point between which circuit points a balanced electric input signal is intended to be present.

Different transmitter circuits of the above mentioned kind are known. A pair of electric conductors has a certain characteristic impedance for example 100 ohm. In order to avoid undesired reflections, such a pair of electric conductors should in its end point be connected to a load which corresponds to the characteristic impedance.

It should be noted that by a balanced signal is meant that the signal that is present on the pair of conductors is such that the voltages on corresponding points on the two conductors are of the same magnitude but have opposite polarity to a reference potential. This reference potential is usually earth potential. With an unbalanced signal (or "single-ended") is meant that the signal, i.e. the voltage variation, is only present on one conductor, while the other conductor, or reference potential, is at a constant potential, usually on earth potential.

On a pair of conductors with a balanced signal, due to noise or other phenomena, a signal which is superposed on the two conductors may occur, a so-called common mode signal, which signal may vary with time. This signal is often undesired and should therefore be suppressed. This is often done with the help of, for example, transformers, baluns (a balun is a device which converts a balanced signal to an unbalanced signal) and differential amplifiers.

Also when a balanced electric signal is to be converted to an optical signal, such an undesired superposed signal need to be suppressed in order for the light source, which transmits the optical signal, to be correctly operated. According to the prior art, this has usually been done by first converting the balanced electric signal to an unbalanced electric signal.

FIG. 2 shows an example of the prior art. The electric balanced input signal is here present on a twisted pair 30. The balanced signal is converted to an unbalanced signal with the help of a balun 41 and a transformer 42. The circuit also comprises a termination resistance 43 which is adapted to the characteristic impedance of the twisted pair 30. Thereafter follows one or more circuits 44, which i.a. produce a suitable bias current and a modulation current, wherein the total current drives the light source 20.

Also EP-A-0 542 480 shows an example of a transmitter circuit. The transmitter circuit comprises two differentiators and an amplifier for driving a light emitting diode.

The prior known solutions are relative complicated and expensive, since they often comprise relatively complicated and expensive components, such as active components or transformers. Furthermore, known transmitter circuits often have a relatively high current consumption.

It should be noted that by active components is meant components which produce a gain or a switching, for example transistors, integrated circuits, and diodes.

SUMMARY OF THE INVENTION

An object of the present invention is to achieve a transmitter-receiver device which may be implemented with relatively simple means and which enables a reliable communication by means of optical signals. An object thereby is to achieve a transmitter-receiver device which may be used in a bi-directional optical communication system with improved network management possibilities compared to previous systems and which comprises a transmitter circuits which functions well and which is more simple than typical known transmitter circuits. The above-described disadvantages with such previous systems should therefore be avoided with the present invention.

These objects are achieved with a transmitter-receiver device according to claim 1. Since the transmitter-receiver device is arranged with such a third output and a status signal which indicates if the transmitter-receiver device is in the test mode or not, the transmitter-receiver device may be used in a bi-directional system where a network management system connected to one side may also supervise the status of the other side. This will become clear from the description below. With the invention, also the advantage is achieved that the balanced signal to the transmitter unit does not need to be converted to an unbalanced signal. The transmitter circuit can thereby be realised with simple and inexpensive components.

It should be noted that by "normal operation conditions" is meant that the transmitter circuit works within voltages and currents which are normal for the transmitter circuit, where, as has been mentioned, also an undesired superposed voltage may be present on the balanced electric signal. However, for example extreme voltage peaks may be considered to constitute non-normal operation conditions.

An embodiment of the invention is clear from claim 2. Since the time between the light pulses is so short, the device according to the invention may suitably be used in a system with a safety function which operates essentially quicker than according to the above-described system. Furthermore, this short time makes it possible that the status of different signals of one side of a bi-directional system corresponds to the status signals on the other side of the system. As also will become clear from the description below, such a short time also makes it possible to in a simple manner measure with a normal optical power meter whether a connection is the case between two parts in a bi-directional fibre optic system.

Still another embodiment is clear from claim 3. According to this embodiment, it may, via the fifth output, be supervised whether the receiver unit receives an information carrying signal over a working optical conduction path.

Another embodiment is clear from claim 4. With the help of the seventh output, it may be supervised whether the transmitter unit transmits information over a working connection.

Another preferred embodiment is clear from claim 5. This mirrored symmetry may preferably be achieved if the first and the second circuit branches comprise components with exactly the same value on corresponding positions in the respective circuit branch. The feature that the electric properties of the components correspond to each other means however that it does not have to be exactly the same components on the two circuit branches, as long as the electric properties of the two circuit branches are the same. For example, the electric properties which together are the case in the component or components which are arranged between two nodes in one of the circuit branches ought to correspond to the same electric properties which together are the case in the component or components which are arranged between the corresponding two nodes in the second circuit branch.

Since the transmitter circuit is formed with this symmetry, it is possible to, with simple components, maintain a balanced signal all the way to the light source. Furthermore, it is achieved that the light source is only modulated by the voltage difference between the above mentioned first and second circuit points. The current through the light source is thus independent of a possible common-mode signal which is present on said first and second circuit points.

A further embodiment is clear from claim 6. Thereby, a suitable bias-current through the light source may be obtained in a simple manner. Suitably at least one of said first and second constant voltages may be adjustable. Hereby, the bias-current may simply be adjusted without influencing the modulation current.

A further embodiment is clear from claim 7. Hereby, the advantages of the transmitter circuit are achieved in a simple manner and with inexpensive components. Preferably, no transformers or magnetic components are used in the transmitter circuit. As has been mentioned above, also no balun is used.

The receiver unit of the transmitter-receiver device suitably has an amplifier circuit, which amplifies the incoming signal to a suitable level.

In this context prior known amplifier circuits should be mentioned. U.S. Pat. No. 5,917,639 and U.S. Pat. No. 6,055,094 describe different kinds of known amplifier circuits.

An amplifier circuit may for example be used when it is desired that a signal should lie at a predetermined level. Such an amplifier circuit is often called AGC (Automatic Gain Control).

A disadvantage with prior known amplifier circuits is that it is often difficult to control the amplification for different kinds of signals. For example, some signals may comprise pulses of a very high frequency and other signals may comprise pulses with relatively long pauses between the pulses. When pulses arrive with long pauses between the pulses, the amplifier circuit may tend to amplify the signal, which may mean that when then pulses of a high frequency arrive, the amplification may be too high, which may lead to different problems, the amplifier may for example be saturated and the amplification may become non-linear.

A preferred embodiment of the present invention is clear from claim 8. Since the amplification is set in accordance with the control signal which gives the lowest amplification, the risk is reduced that a too high amplification is set when the control signals from the first and the second control unit differ.

Another preferred embodiment of the invention is clear from claim 9. Hereby is in a simple manner achieved that the amplifier circuit takes different kinds of signals into account and ensures that a too high amplification, which could have been caused by some of the signals, is avoided.

A further embodiment is clear from claim 10. Through this embodiment the problem is avoided that a signal with relatively long pauses between the pulses may lead to a too high amplification This is avoided since the second control unit is arranged to sense this kind of signal.

The receiver unit of the transmitter-receiver device suitably has an optical input stage. Such an input stage may be followed by further amplifiers.

In this context prior known optical input stages should be mentioned.

FIG. 3 shows schematically an example of such an optical input stage according to the prior art. The input stage comprises a light sensitive member 301. The light sensitive member 301 may for example constitute a photo-diode. The light sensitive member 301 delivers an electric signal in response to an optical input signal, for example from an optical fibre (not shown in the figure). According to the shown example, the cathode of the photo-diode 301 is connected to a bias voltage V1. The circuit comprises an amplifier component 302, which is often called preamplifier. The amplifier component 302 has a first input 304 which receives an electric signal from the light sensitive member 301. The amplifier component 302 influences the amplification of the electric signal and delivers an amplified output signal via a first output 306. The shown photo-diode 301 delivers a current into the input 304, wherein the strength of the current depends on detected light. The amplifier component 302 converts the current to a voltage at the output 306. The transfer function therefore gets the unit V/A, i.e. ohm. The amplification of the amplifier component 302 may thus be stated in ohm. The amplifier component 302 may also comprise an internal amplification control unit 308 which for example may be arranged to reduce the amplification at too high currents.

The English abstract of JP-A-10284955 shows an example of this kind of optical input stage. This document shows such an input stage with a control circuit for controlling the amplification in response to an average value of the optical input power.

Also WO99/28768 shows an optical input stage where a control circuit controls a variable impedance element in the form of a diode connected to an amplifier input.

The English abstract of JP-A-09298426 shows an optical input stage with a preamplifier. In this case the preamplifier has a special input where a control signal may be connected for controlling the amplification of the preamplifier. However, an optical input stage usually lacks a special input for controlling the amplification. An example of an input stage is the one which is sold with the name MC2006 of the fabrication Microcosm. For example this input stage comprises an internal control unit for reducing the amplification at too high currents. However, the input stage lacks a special input for being able to control the amplification.

A further preferred embodiment of the present invention is clear from claim 11. According to this embodiment it is possible to control the amplification in an optical input stage with an amplifier component which does not have any special input intended for controlling the amplification.

The filter unit may for example constitute a capacitor. This filter unit disconnects a possible direct current from the light sensitive member. Instead the control unit is connected to the first input. The power of the input signal at the first input is thus controlled with the help of the control unit instead of with the help of a direct current from the light sensitive member. Thereby, the power of the output signal from the second output may be influenced with the help of the control unit, i.e. the purpose to be able to control the amplification of the amplifier component is achieved.

Another embodiment of the invention is clear from claim 12. According to this embodiment, a light sensitive member may thus be used where the current into the first input depends on detected light intensity.

Still an embodiment is clear from claim 13. According to this embodiment, for example a photo-diode of the kind which has been described above may thus be used as light sensitive member.

Still an embodiment is clear from claim 14. Hereby is prevented that the amplifier component is set at a too high amplification.

A further embodiment is clear from claim 15. For example if the circuit is arranged such that always a certain current is input via said first input, then the second diode unit may be arranged for preventing a current in the opposite direction.

As has been mentioned above, a further object of the invention is to achieve a communication system. The object thereby is to achieve a system with improved network management possibilities compared to previous systems.

This object is achieved with a communication system according to claim 16.

With such a communication system, the above-described advantages are achieved. Such a system makes it possible, by supervising the status of one side of the system, to also have information about the status of the corresponding signals of the other side of the system.

A preferred embodiment of the communication system is clear from claim 17. With the help of the network management system, the function of both transmitter-receiver devices may thereby be supervised even if the network management system is only connected to one of the devices.

Another preferred embodiment of the communication system is clear from claim 18. The network management system may hereby supervise whether a working connection is the case between the two transmitter-receiver devices.

Another preferred embodiment of the communication system is clear from claim 19. The network management system may hereby supervise the status of several of said outputs.

Still an embodiment of the communication system is clear from claim 20. By supervising one of the transmitter-receiver devices, information may hereby also be obtained concerning the corresponding outputs of the second transmitter-receiver device.

DETAILED DESCRIPTION OF EMBODIMENTS OF THE INVENTION

Examples of different embodiments of the invention will now be described. First a transmitter-receiver device and a communication system will be described. Then different parts which may form part of the transmitter-receiver device will be described.

Figure 4:
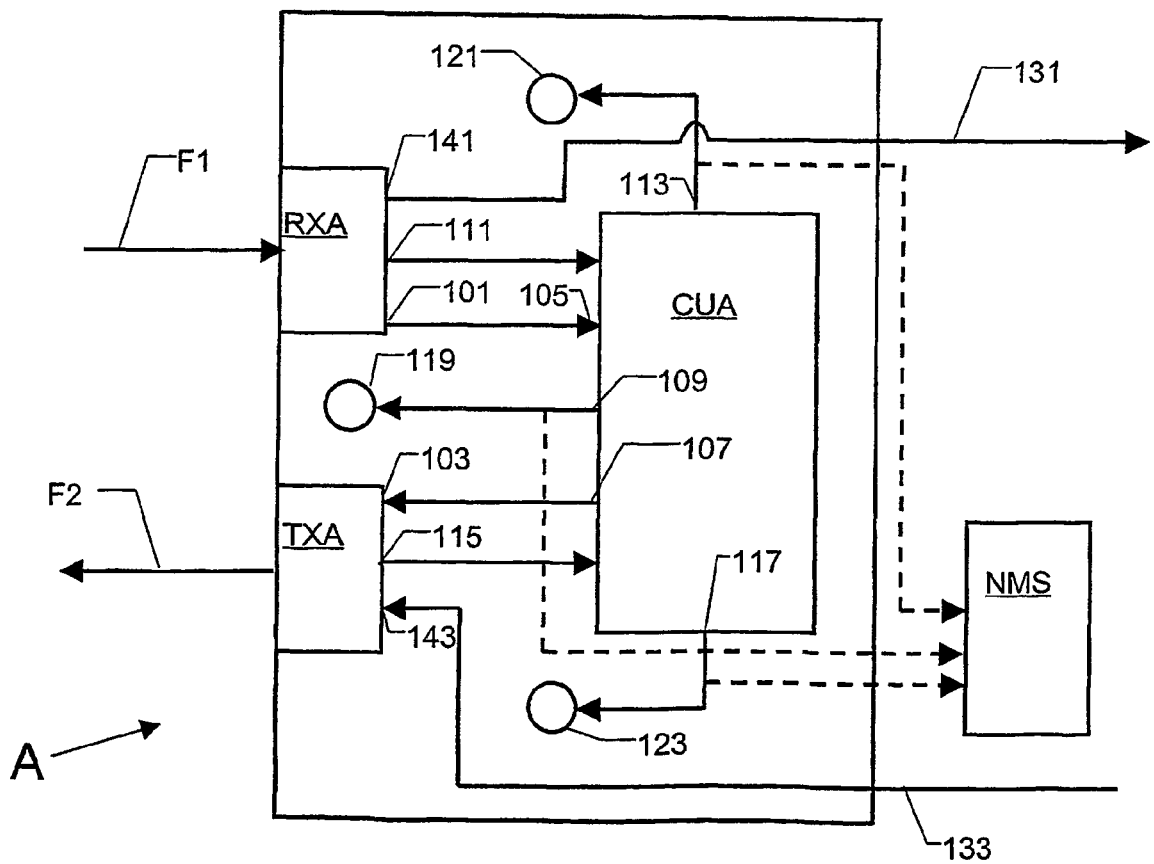
FIG. 4 shows schematically a transmitter-receiver device according to the present invention.

FIG. 4 shows a transmitter-receiver device A according to an embodiment of the present invention. In a communication system according to the invention, suitably two such transmitter-receiver devices A, B form part, which devices are connected in the manner shown in FIG. 1.

FIG. 4 shows a first optical conduction path F1. Furthermore, FIG. 4 shows a second optical conduction path F2. These first and second optical conduction paths F1, F2 may suitably consist of optical fibres. The transmitter-receiver device A comprises a receiver unit RXA which receives light from the optical fibre F1. Furthermore, there is a transmitter unit TXA which transmits light on the optical fibre F2. The receiver unit RXA has a first output 101 which indicates whether the receiver unit RXA receives light. The transmitter unit TXA has a first input 103 which controls whether the transmitter unit TXA shall transmit light in response to an electric input signal.

The device also comprises a supervising unit CUA. The supervising unit CUA has a second input 105 connected to the first output 101 and a second output 107 connected to the first input 103. The supervising unit CUA is arranged to prevent the transmitter unit TXA from continuously transmitting light when the supervising unit CUA detects that the receiver unit RXA does not receive light. Furthermore, the supervising unit CUA is arranged to change to a test mode when it detects that the receiver unit RXA does not receive light. During the test mode, the supervising unit CUA controls the transmitter unit TXA to intermittently transmit short light pulses on the second optical fibre F2. This function is thus similar to previously known eye-safe systems.

The supervising unit CUA has a third output 109 where a status signal indicates whether the device is in said test mode. The supervising unit CUA may be implemented in hardware or in software. For example, the supervising unit CUA may consist of a so-called microcontroller.

The third output 109 may be connected to a first indicator 119 and/or to a network management system NMS. If the third output 109 is connected to an indicator 119, this indicator 119 may, according to a preferred embodiment, emit light if the device is in said test mode and be put out if the device is not in the test mode. The indicator 119 may, for example, consist of a red light emitting diode.

As has been described above, said test mode means that the transmitter unit TXA only intermittently transmits short light pulses. If the device A forms part of a bi-directional system with a corresponding device B, this means that the receiver unit TXB does not detect any continuous light on the fibre F2 when the device A has entered into said test mode. This means that also the device B enters into the test mode, wherein a corresponding output 109 in the device B has the same status as the output 109 in the device A. According to a preferred embodiment of the invention, the distance between the light pulses in the test mode is less than 1 second, preferably less than 0.1 second and most preferred less than 5 milliseconds. The length of the pulses in the test mode is suitably 0.1%–25%, preferably 3%–20%, and most preferred 5%–13% of the distance between light pulses.

Figure 5:
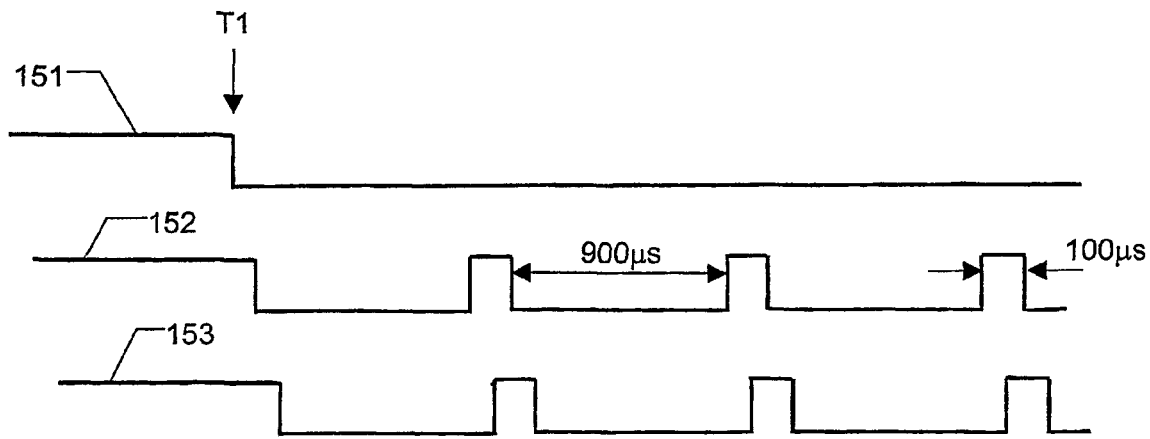
FIG. 5 shows the course of events in time for the function of the invention when a disruption occurs on an optical connection.
Figure 6:
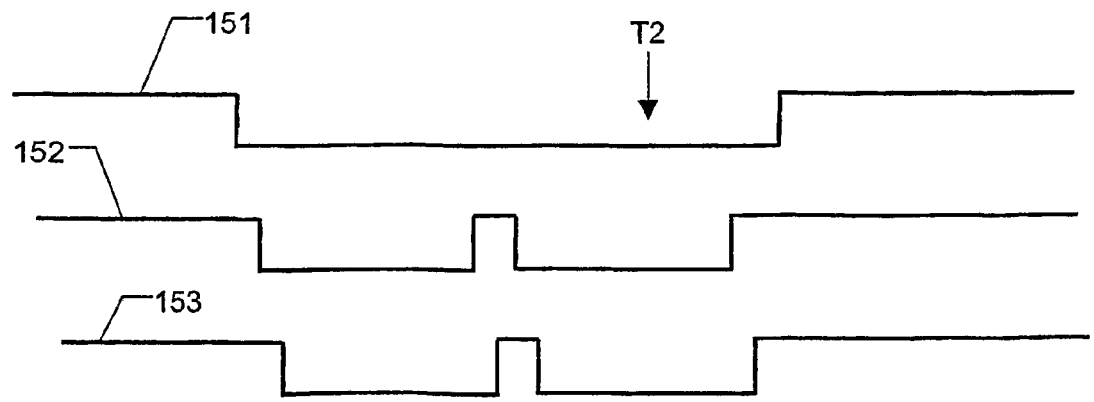
FIG. 6 shows a similar course of events in time as FIG. 5 when a connection is created again in the previously disrupted optical connection.

With reference to FIGS. 5 and 6 it will now be described how the device is arranged to function when a disruption occurs in the connection between a first and a second device A, B. Suppose that a disruption occurs in the fibre F1 at the time T1. The upper graph 151 in FIG. 5 shows the light intensity which reaches RXA. This intensity thus sinks at the time T1 when a disruption takes place in the fibre F1. The supervising unit CUA thereby controls the device A such that it changes into said test mode. The second graph 152 in FIG. 5 shows the light that is transmitted from TXA. Shortly after the time T1, because of a small delay in the electronics, the device A changes to said test mode. According to the shown embodiment, TXA transmits, during the test mode, intermittently short light pulses, wherein each light pulse is only 100 µs. The distance between the light pulses is, according to this embodiment, 900 µs. The light pulses which are transmitted from TXA are received by RXB.

Because of the transfer time in the fibre F2, these pulses are received somewhat later than when they are transmitted. TXB is controlled by a supervising unit in such a manner that TXB transmits light as soon as RXB receives light. The graph 153 in FIG. 5 shows the light which is transmitted from TXB. As can be seen in FIG. 5, TXB therefore transmits light pulses in the same manner as TXA during the test mode but with a small time delay caused by a delay in the transfer and in the electronics. This means that if the device A changes into the test mode, then also the device B changes into this mode.

FIG. 6 shows the same graphs as FIG. 5 when the connection along the fibre F1 is re-established. It is assumed that this connection is re-established at the time T2. When the next pulse is transmitted from TXA, RXA receives an answer from TXB before TXA has been switched off. This means that TXA is allowed to continue to be switched on, which means that RXB senses a continuous input power and therefore lets TXB be switched on. The connection is thus re-established.

Since the device B is in the test mode when and only when the device A is in said test mode (except for a small time delay), it follows that said third output 109 of the device A always has the same status as the corresponding output of the device B. By supervising the status of this output 109 in the device A, information is thus obtained also concerning the status of the corresponding output in the device B. This means that a network management system NMS connected to the device A indirectly also supervises the device B.

There are further advantages in that the device has such a short time distance between the pulses when it is in said test mode. One reason is that a user who, for example, connects and disconnects optical contacts immediately will see if the connection works or not. Since the test mode works with said short time distance, information may immediately be obtained of whether the optic connection works. Another advantage is that one sometimes with an optical power meter would like to measure if there is power in a fibre or not. This is usually done in that the fibre is disconnected from a receiver unit and connected to a power meter. Since the fibre is disconnected, the device changes to the test mode. Since the pulses during the test mode arrive with such a short time distance, a normal optical power meter will measure a certain power in the fibre. This measured power corresponds to the average power in the fibre. This average power during the test mode is, for example, ten times lower than the normal power when the connection is not in the test mode. With the help of the power meter, information may thus immediately be obtained concerning whether test pulses are received at the power meter. This means that the fibre in question is not broken, since otherwise no test pulses would reach the power meter. With a conventional slower device, on the other hand, where the distance between the pulses is essentially longer, one would with a power meter for the most part measure no optical power at all and sometimes a little optical power. This makes fault-tracing essentially more difficult in a system with several fibres, since it may thereby be difficult to determine in which fibre there is a disruption.

A further advantage of the invention is that the device, in spite of the fact that it works so fast, may protect against eye damages in a similar manner as previous slower working systems.

FIG. 4 also shows that the transmitter-receiver device A may have further components. FIG. 4 thus shows that RXA has an output 141 where an information carrying signal from RXA is transmitted. In a similar manner, TXA has a further input 143 where an information carrying electric signal is received by TXA. The receiver unit RXA also has a fourth output 111 which is connected to the supervising unit CUA. At the fourth output 111, a signal is the case which indicates whether the receiver unit RXA receives an information carrying signal via the first optical fibre F1. Furthermore, the supervising unit CUA has a fifth output 113. On this fifth output 113, a status signal is the case which depends on the status of the signal of the third output 109 and the status of the signal from the fourth output 111. The fifth output 113 may suitably be connected to a second visual indicator 121 and/or to the network management system NMS. The supervising unit CUA may suitably be arranged such that the second indicator 121 is lit if the fourth output 111 indicates that the receiver unit RXA receives an information carrying signal at the same time as the output 109 indicates that the connection works. The reason that the output 111 is connected to the supervising unit CUA instead of to be directly connected to, for example, the second indicator 121 is that when the optical connection does not work, some light may sometimes still be received which would mean that the second indicator 121 would twinkle.

The transmitter unit TXA also has a sixth output 115 which is connected to the supervising unit CUA. At the sixth output 115 a signal is the case which indicates if the transmitter unit TXA receives an electric information carrying signal on the input 143. The supervising unit CUA also has a seventh output 117. The seventh output 117 has a status signal which depends on the status of the signal of the third output 109 and the status of the signal from the sixth output 115. This seventh output 117 may be connected to a third indicator 123 and/or to the network management system NMS. The supervising unit CUA is suitably arranged such that-said seventh output 117 has a certain status if both the output 109 shows that the connection works and the output 115 shows that TXA receives an information carrying signal.

The supervising unit CUA is suitably arranged such that the status of the signals at said third, fourth, fifth, sixth, and seventh outputs (109, 111, 113, 115, 117) fulfills the following status schedule:

| Fourth output | Sixth output | Third output = 0 | Third output = 1 |
| --- | --- | --- | --- |
| 0 | 0 | Fifth output = 0<br>Seventh output = 0 | Fifth output = 0<br>Seventh output = 0 |
| 0 | 1 | Fifth output = 0<br>Seventh output = 0 | Fifth output = 0<br>Seventh output = 1 |
| 1 | 1 | Fifth output = 0<br>Seventh output = 0 | Fifth output = 1<br>Seventh output = 1 |
| 1 | 0 | Fifth output = 0<br>Seventh output = 0 | Fifth output = 1<br>Seventh output = 0 | wherein the first column indicates the status of the fourth output 111, the second column indicates the status of the sixth output 115, in the third column the third output 109 has status=0 and in the fourth column the third output 109 has status=1, and wherein the respective status stands for the following:

Third output 109=1, the connection works and the transmitter-receiver device is not in said test mode;

Third output 109=0, the transmitter-receiver device is in said test mode;

Fourth output 111=1, the receiver unit RXA receives an information carrying signal;

Fourth output 111=0, the receiver unit RXA does not receive an information carrying signal;

Fifth output 113=1, indicates that there is a working optical connection with an information carrying signal to the receiver unit RXA;

Fifth output 113=0, indicates that there is no working optical connection with an information carrying signal to the receiver unit RXA;

Sixth output 115=1, the transmitter unit TXA receives an electric information carrying input signal;

Sixth output 115=0, the transmitter unit TXA does not receive an electric information carrying input signal;

Seventh output 117=1, indicates that there is a working optical connection with an information carrying signal which is transmitted from the transmitter unit TXA;

Seventh output 117=0, indicates that there is no working optical connection with an information carrying signal which is transmitted from the transmitter unit TXA.

Figure 1:
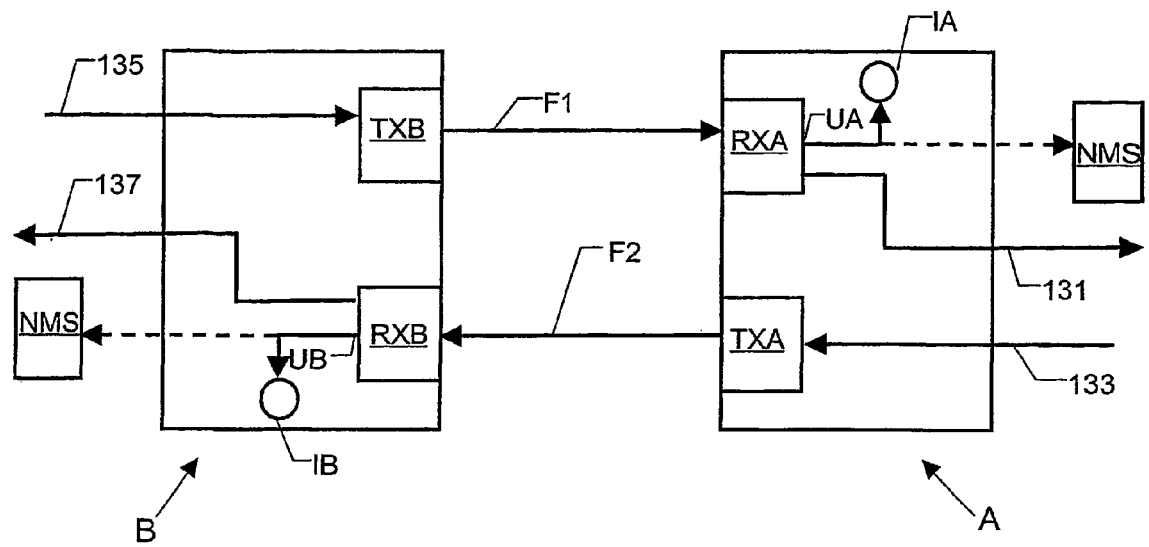
FIG. 1 shows schematically a bi-directional fibre optic communication system according to the prior art.

As has been mentioned above, the device A may be used in a communication system together with a corresponding device B. When these devices A, B form part of a communication system of the kind that is shown in FIG. 1, the great advantage is obtained by the invention that the status of said third 109, fifth 113, and seventh 117 outputs of one transmitter-receiver device A is exactly the same as the status of the corresponding outputs in the device B. This means, as has been explained above, that the status of the third output 109, which indicates whether the connection works, is the same both in the device A and the device B. Furthermore, the status of the fifth output 113, which indicates whether the device A receives an information carrying signal, is the same as the status of the seventh output 117 of the device B, which seventh output of the device B indicates that TXB transmits an information carrying signal. In a corresponding manner, the status of the fifth output 113 of the device B is the same as the status of the seventh output 117 of the device A. By only supervising, for example, the device A, one knows, for instance, that if the seventh output 117 has a certain status, then an information carrying signal is transmitted on the optical fibre F2 from the transmitter unit TXA, but, furthermore, one knows that this signal is received by the receiver unit TXB, since the seventh output also indicates that the optical connection over the fibres F1 and F2 between the device A and the device B works.

A transmitter-receiver device according to the invention may suitable be arranged on a circuit card. Such a device A may, for example, be arranged in or in connection to a wall in a home or in an office. The device may, of course, also form part of a centrally located device which is controlled by a network operator which transmits and receives signals to a device arranged in a home or in an office.

It should be noted that by "light" is in this application not necessarily meant that the light must be visible. Also invisible electromagnetic radiation may be transferred over the optical conduction paths.

Now preferred embodiments of the transmitter circuit which forms part of the invention will be described.

Figure 7:
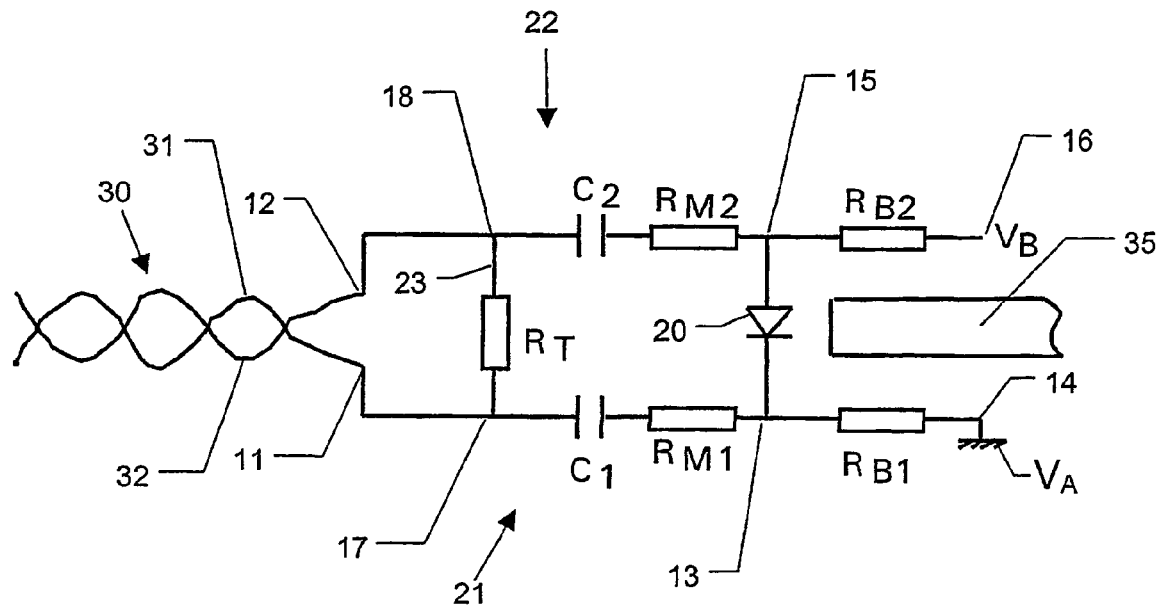
FIG. 7 shows a transmitter circuit which may form part of an embodiment of the invention.

FIG. 7 shows a transmitter circuit arranged between an electric line and an optical fibre. The figure shows a twisted pair 30 of conductors 31, 32. These conductors are connected to a first 11 and a second 12 point of the transmitter circuit. It should be noted that other kinds of conductors than a twisted pair 30 are possible. For example, a ribbon cable is thus conceivable or simply two conductors on a circuit card. A balanced electric input signal is conducted to the first 11 and second 12 points. The transmitter circuit converts this signal to an optical signal which is transmitted from a light source 20. An optical conductor 35 can conduct light from the light source 20.

The transmitter circuit has a first circuit branch 21 and a second circuit branch 22. The first circuit branch 21 extends from the first point 11 via a third point 13 to a fourth point 14. The second circuit branch 22 extends from the second point 12 via a fifth point 15 to a sixth point 16. The light source is connected between the third point 13 and the fifth point 15. The first circuit branch 21 comprises a first capacitor $C_1$ and a first resistance $R_{M1}$ which are connected in series after each other between the first point 11 and the third point 13. In a corresponding manner, the second circuit branch 22 comprises a second capacitor $C_2$ and a second resistance $R_{M2}$ which are connected in series between this second point 12 and the fifth point 15.

Furthermore, the first circuit branch 21 comprises a third resistance $R_{B1}$ which is arranged between the third point 13 and fourth point 14. The fourth point 14 is arranged to be at a first constant voltage $V_A$. In the shown example, this first voltage $V_A$ is earth potential. Furthermore, the second branch 22 comprises a fourth resistance $R_{B2}$ which is arranged between the fifth point 15 and the sixth point 16. The transmitter circuit is arranged such that a second constant voltage $V_B$ is the case at the sixth point 16. One of said first $V_A$ and second $V_B$ constant voltages may suitably be adjustable. For example, the second constant voltage $V_B$ may be adjustable. Thereby, the bias-voltage through the light source 20 may be simply adjusted without influencing the modulation current.

The transmitter circuit also comprises a third circuit branch 23. This third circuit branch 23 extends from a point 17 on the first circuit branch 21 to a point 18 on the second circuit branch 22. On the third circuit branch 23, a termination resistance $R_T$ is arranged. By a suitable choice of this termination resistance $R_T$, the impedance of the circuit may be adapted to the characteristic impedance of the conduction pair 30 which is connected to the transmitter circuit. The components which are positioned on the first 21 and second 22 circuit branches are chosen such that the transmitter circuit is formed with a symmetry. The symmetry is such that a balanced drive voltage is the case between the third 13 and the fifth 15 points. The balanced drive voltage is independent of a possible superposed voltage which is present on the input signal, i.e. on the two first 11 and second 12 points. In this manner, the light source 20 is modulated exactly in response to the voltage difference between the two conductors 31, 32 which are connected to the first 11 and second 12 points, respectively.

The easiest manner of achieving said symmetry is that the electric properties of the components which are arranged between different nodes on the first circuit branch 21 correspond to the same electric properties of the components which are arranged in corresponding positions in the second circuit branch 22. This purpose may simply be achieved if the first capacitor $C_1$ has the same value as the second capacitor $C_2$, the first resistance $R_{M1}$ has the same value as the second resistance $R_{M2}$, and the third resistance $R_{B1}$ has the same value as the fourth resistance $R_{B2}$.

An advantage with the invention is that all components which are arranged on the respective circuit branch 21, 22 between the first 11 and the fourth point 14 and between the second 12 and the sixth point 16, respectively, may be passive components. In the shown case, these components consist only of capacitors and resistances. Hereby, also the use of transformers or more expensive magnetic components is avoided.

A suitable bias-current through the light source 20 is selected by the choice of the second constant voltage $V_B$, the third resistance $R_{B1}$, and the fourth resistance $R_{B2}$. The scaling factor between the voltage of the balanced input signal and the modulation current through the light source 20 is selected by a suitable choice of the first resistance $R_{M1}$ and the second resistance $R_{M2}$. The first $C_1$ and the second $C_2$ capacitors prevent a superposed voltage from reaching the light source 20 in the form of a direct current.

Figure 2:
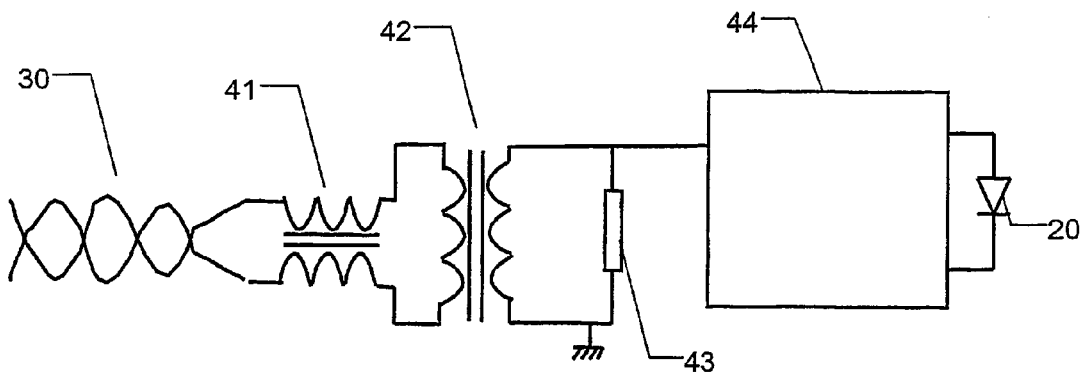
FIG. 2 shows a transmitter circuit according to the prior art.
Figure 3:
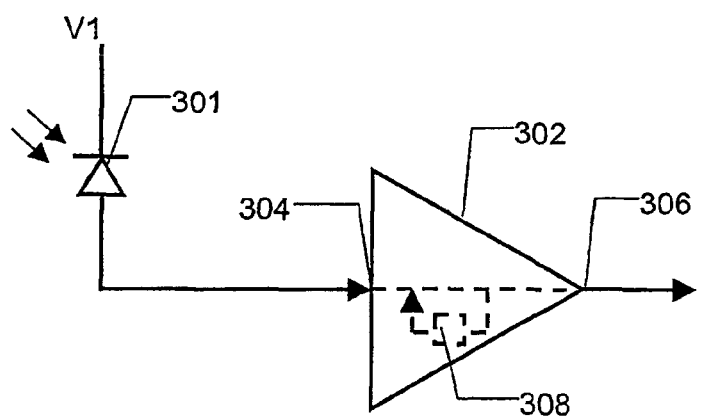
FIG. 3 shows schematically an optical input stage according to the prior art.
Figure 8:
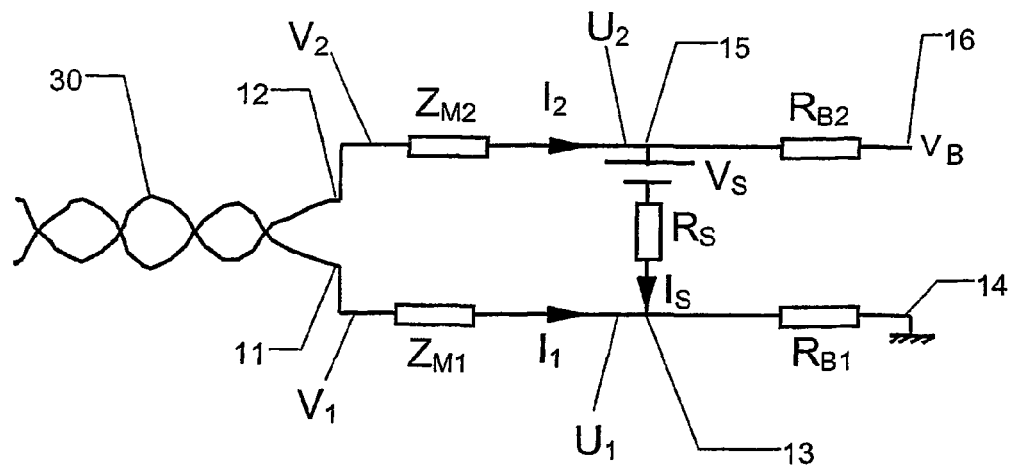
FIG. 8 shows an equivalent circuit of the transmitter circuit according to FIG. 7.

In order to show that the current through the light source 20 is independent of a possible superposed voltage on the conduction pair 31, 32, reference is made to FIG. 8. FIG. 8 shows an equivalent circuit of the transmitter circuit according to FIG. 7. As a light source 20, for example a light emitting diode or a laser diode may be used. A simple model of such a light source 20 is an independent voltage source $V_S$ in series with a resistance $R_S$. $Z_{M1}$ corresponds to the first capacitor $C_1$ in series with the first resistance $R_{M1}$. In a corresponding manner, $Z_{M2}$ corresponds to the second capacitor $C_2$ in series with the second resistance $R_{M2}$. In FIG. 2 also the currents $I_1$, $I_2$, and $I_S$ as well as the voltages $V_1$, $V_2$, $U_1$, and $U_2$ are marked.

With reference to FIG. 8 the following equations may be formed.

$$I_1 = \frac{V_1 - U_1}{Z_{M1}} \qquad (1)$$

$$U_2 = U_1 + V_S + I_S \cdot R_S \qquad (2)$$

$$I_2 = \frac{V_2 - U_2}{Z_{M2}} \qquad (3)$$

$$I_S = \frac{V_B - U_2}{R_{B2}} + I_2 \qquad (4)$$

$$I_S = \frac{U_1}{R_{B1}} - I_1 \qquad (5)$$

Since the transmitter circuit is symmetrically formed, also the following equalities are fulfilled.

$$R_B = R_{B1} = R_{B2} \qquad (6)$$

$$Z_M = Z_{M1} = Z_{M2} \qquad (7)$$

With the help of (1) to (7), the following expression may be derived.

$$I_S = \frac{(V_2 - V_1)R_B - V_S(R_B + Z_M) + V_B Z_M}{R_B(2Z_M + R_S) + Z_M R_S} \qquad (8)$$

From (8) is clear that the current through the light source only depends on the difference between $V_2$ and $V_1$. If, for example, both $V_2$ and $V_1$ suddenly increase, for example with 100 V, the current through the light source is not influenced.

In order to determine the bias-current, $V_2$ and $V_1$ may be set to be equal ($V_2 = V_1$). Thereby, the following is derived.

$$I_{SB} = \frac{V_S(R_B + Z_M) + V_B Z_M}{R_B(2Z_M + R_S) + Z_M R_S} \qquad (9)$$

If it is assumed that $Z_M$ is a resistance in series with a capacitor, as in FIG. 7, then $Z_M$ goes towards infinity at the frequency 0 Hz. Thereby, the following is obtained when $Z_M$ goes towards infinity.

$$I_{SB} = \frac{V_B - V_S}{2R_B + R_S} \qquad (10)$$

The expression (10) thus shows the direct current (the bias-current) through the light source. The modulation current is the total current (8) minus the bias-current (9). The modulation current is thus:

$$I_{SM} = \frac{(V_2 - V_1)R_B}{R_B(2Z_M + R_S) + Z_M R_S} \qquad (11)$$

In order to take a numerical example, it may for example be assumed that the light source is a laser with $V_S$=1.6 V and $R_S$=30 ohm. Furthermore, it may for example be assumed that $V_B$=+5 V. If, for example, a bias-current of 8 mA is desired, then the following is obtained with the help of (10). $R_B$=197.5 ohm If it is assumed that the modulation current should be 1 mA at 1 V difference between $V_1$ and $V_2$, and if it is assumed that the capacitors can be seen as short-circuited at the modulation frequency, then $R_M$ is obtained to the following with the help of (11). $R_M$=450.8 ohm It remains to determine $R_T$ such that the total impedance matches the balanced input impedance of the conductor pair. Without $R_T$ it is the case at higher frequencies ($Z_M = R_M$), that the input impedance is the following.

$$R_{IN} = 2R_M + \frac{2R_B R_S}{2R_B + R_S} \qquad (12)$$

If the obtained numerical values are inserted, then the following is obtained. $R_{IN}$=929.6 ohm If, for example, a total input impedance of 100 ohm is desired, then $R_T$ gets the value 112.1 ohm.

From the above described example, it is clear that the transmitter circuit works as it is intended to work and that the circuit can be dimensioned in a simple manner.

Figure 9:
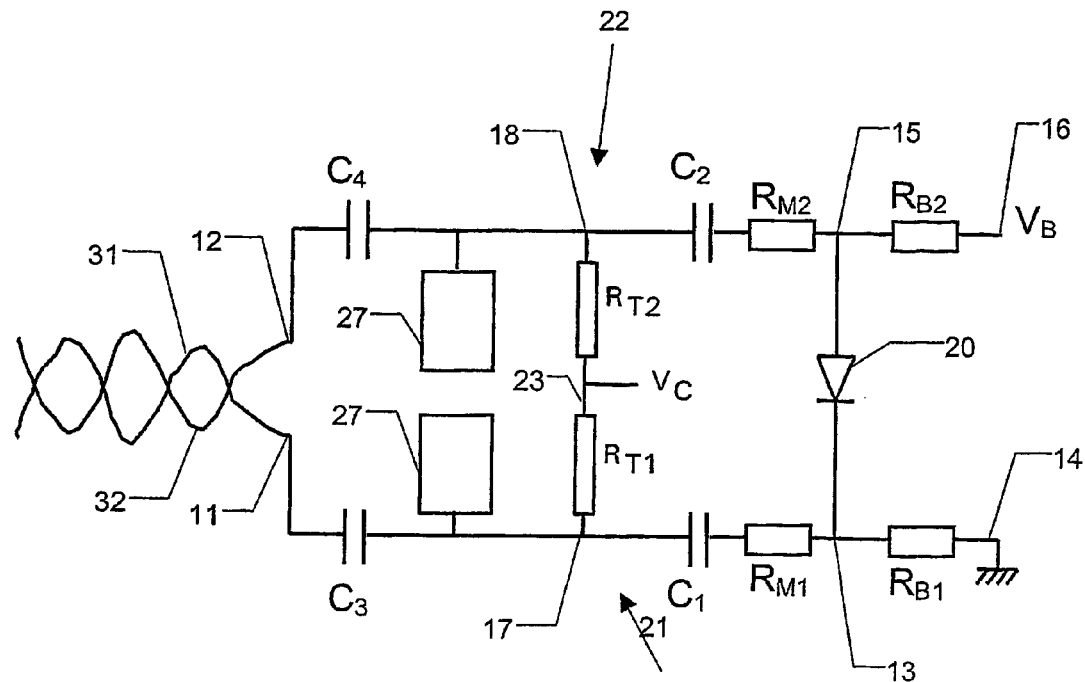
FIG. 9 shows another embodiment of the transmitter circuit.

FIG. 9 shows another embodiment of the transmitter circuit. The transmitter circuit according to FIG. 9 differs from the transmitter circuit according to FIG. 7 in that the third circuit branch 23 comprises a fifth resistance $R_{T1}$ and a sixth resistance $R_{T2}$. These resistances have essentially the same value. Furthermore, the third circuit branch 23 is arranged with a third constant voltage $V_C$ between said fifth $R_{T1}$ and sixth $R_{T2}$ resistances. Furthermore, the transmitter circuit comprises a transient protection 27 arranged to protect the light source 20 against undesired voltage pulses. Furthermore, the first circuit branch 21 of the transmitter circuit comprises a third capacitor $C_3$. The second circuit branch 22 comprises a fourth capacitor $C_4$. In order to achieve a suitable symmetry, suitably the third capacitor $C_3$ has the same value as the fourth capacitor $C_4$.

The transient protection 27 may be realised in different manners known to the person skilled in the art. For example, diodes or zener diodes may be used in order to limit the voltage if it ends up outside a certain interval. With the help of the third capacitor $C_3$ and the fourth capacitor $C_4$, the signal has been AC-coupled before it reaches the transient protection 27. With the help of the third constant voltage $V_C$ and the fifth $R_{T1}$ and sixth $R_{T2}$ resistances, it is secured that the input signal is around the third constant voltage $V_C$ which is adjusted to the transient protection 27. It is thereby achieved that the transient protection 27 only limits the voltage if non-normal voltages occur. Through the third constant voltage $V_C$ and the fifth $R_{T1}$ and sixth $R_{T2}$ resistances, also reflections and other problems are reduced, since a so-called common-mode termination is achieved which means that signals which are common to the two conductors are terminated.

Figure 10:
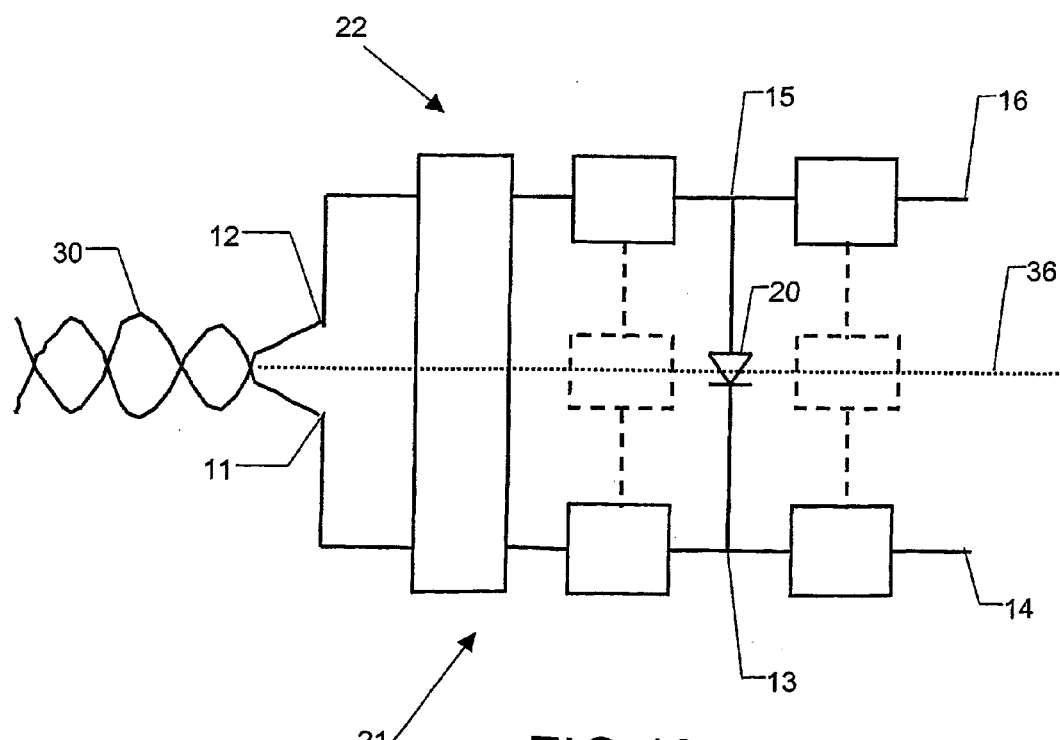
FIG. 10 shows the principle of preferred embodiments of the transmitter circuit.

FIG. 10 shows the principle of the transmitter circuit. As is indicated with hatched lines in FIG. 10, the transmitter circuit may comprise further cross-connections between the first circuit branch 21 and the second circuit branch 22. It is even possible that the transmitter circuit comprises active components. However, preferably passive components are used. Concerning the components which are important for the normal operation of the transmitter circuit, it is preferably the case that these components are arranged such that the transmitter circuit is formed mirror-symmetrical along a symmetry line 36 which passes through the middle of possible cross-connections. Thereby, the above described advantages are achieved in a simple manner. Certain particular components, such as transient protection, which do not have any influence on the normal operation, do not necessarily have to be arranged with the mirrored symmetry. It should also be noted that the transmitter circuit may comprise further components. For example, the transmitter circuit may be arranged with a low-pass filter for preventing high frequency signals from reaching the light source.

The transmitter circuit has several advantages, such as has already been described above. The input signal does thus not have to be converted into an unbalanced signal. This means i.a. that the voltages at the points 13 and 15 will be in opposite phases, which means that disturbances which could reach other components will be small, since such disturbances from the points 13 and 15 tend to cancel each other.

Now embodiments of an amplifier circuit which may form part of the receiver unit RXA, RXB of the invention will be described.

Figure 11:
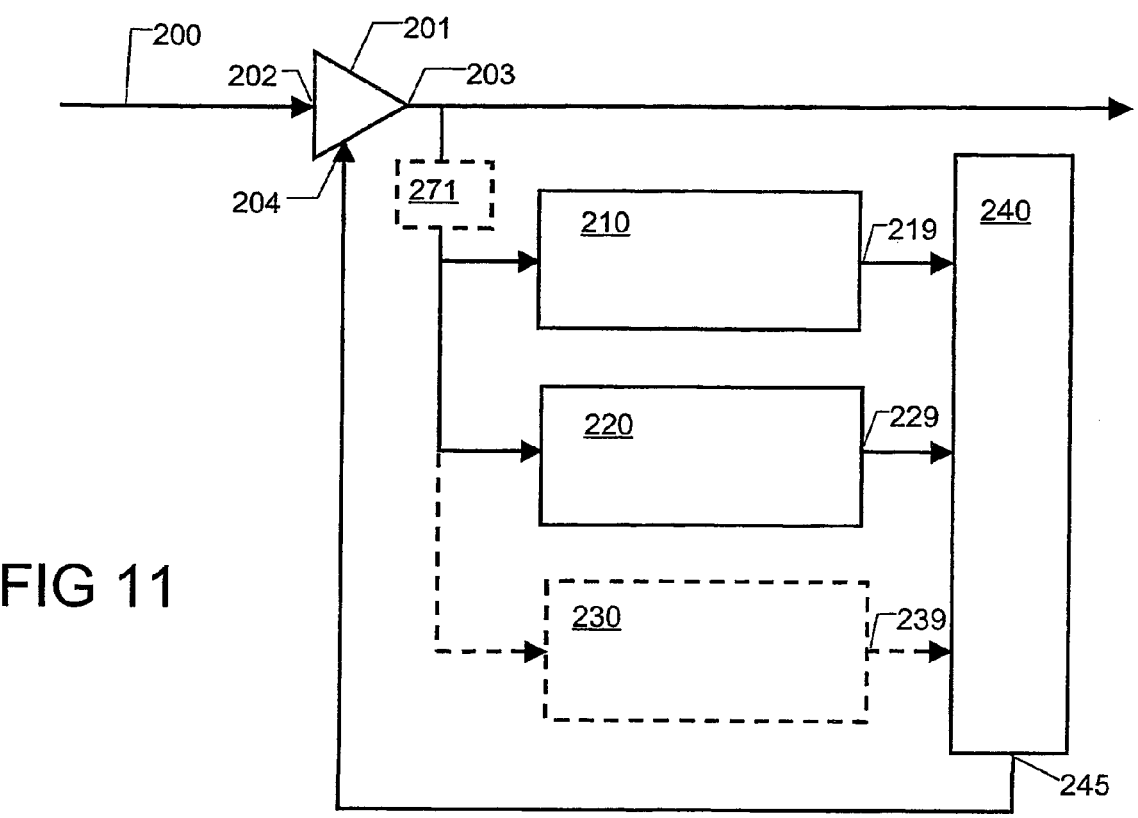
FIG. 11 shows schematically a first embodiment of an amplifier circuit which may form part of the invention.

FIG. 11 shows an embodiment of the amplifier circuit. According to the shown example, an optical signal is present on a conductor 200. The signal is conducted to an input 202 of an amplifier unit 201. Suitably the optical signal on the conductor 200 is converted to an electric signal. This is not explicitly shown in the figure. This conversion may be thought to take place in an input stage which forms part of the amplifier unit 201. The electric signal may either be in the form of a current or in the form of a voltage. The amplifier unit 201 is arranged to influence the amplification of the input signal and to transmit an output signal via an output 203. The amplifier unit 201 is according to a preferred embodiment suitably arranged such that a balanced output signal is present at the output 203. There may of course also be a unit which converts an electric output signal from the amplifier unit 201 to an optical signal before this signal for example is transmitted in an optical conductor.

It should be noted that by "amplification" is in this document also comprised the possibility that the signal is made weaker (amplification less than 1). This may be the case if the signal is in the form of a voltage. However, preferably a real amplification of the signal takes place.

It should also be noted that it is not always necessary that the optical signal is converted to an electric signal before the signal is amplified. The amplifier unit 201 may thus have both an optical input signal and an optical output signal. In this case there may suitably be a transducer 271 which converts the optical output signal to an electric signal before the signal is conducted to the control units 210, 220, 230 described below.

The output signal from the output 203 is conducted to a first control unit 210 which is arranged to sense said output signal and to deliver a first control signal at an output 219. This first control signal is intended to control the amplification of the amplifier unit 201. The output signal from the output 203 is also conducted to a second control unit 220 which also is arranged to sense said output signal and to deliver a second control signal via an output 229. Also the second control signal is intended to control the amplification of the amplifier unit 201. The first control unit 210 is suitably specially arranged to sense a first kind of signal and the second control unit 220 is specially arranged to sense a second kind of signal. For example, the first control unit 210 may be arranged to sense an output signal which is continuous or which comprises pulses with a relatively short pause between the pulses and the second control unit 220 may be arranged to sense an output signal which comprises pulses with relatively long pauses between the pulses.

As has been described above, the input signals on the conductor 200 can be optical signals. Such signals may be transmitted as square pulses of a certain frequency. For example, signals which transfer information may have a frequency of about 100 Mbit/s or 1 Gbit/s. Pulses may also arrive as blocks with a frequency of about 10 Mbit/s. When no information is transferred, often so-called link-pulses (or "idle-pulses") are transmitted. These pulses may for example have a frequency of about 100 Hz, thus an essentially lower frequency than the information carrying signals. For example, the first control unit 210 may thus be adapted to sense signals with the frequency 10 Mbit/s and faster, while the second control unit 220 is adapted to sense pulses with a frequency of 100 Hz.

The output signals from the outputs 219 and 229 are conducted to a selector unit 240 which has an output 245 from which a signal is conducted back to an input 204 of the amplifier unit 201 for controlling the amplification. The selector unit 240 is arranged to control the amplification of the amplifier unit 201 in accordance with that one of said first and second control signals which gives the lowest amplification.

The amplifier circuit may comprise an arbitrary number of control units adapted to the different kinds of signals which are the case. In FIG. 11 it is indicated with a hatched line a third control unit 230 arranged to via an output 239 deliver a third control signal to the selector unit 240 (of course, the amplifier circuit may comprise more than three control units). The selector unit 240 is arranged to control the amplification of the amplifier unit 201 in accordance with that one of said first, second and third control signals which gives the lowest amplification. The third control unit 230 is suitably specially arranged to sense a third kind of output signal which differs from the first and the second kinds of output signals.

Figure 12:
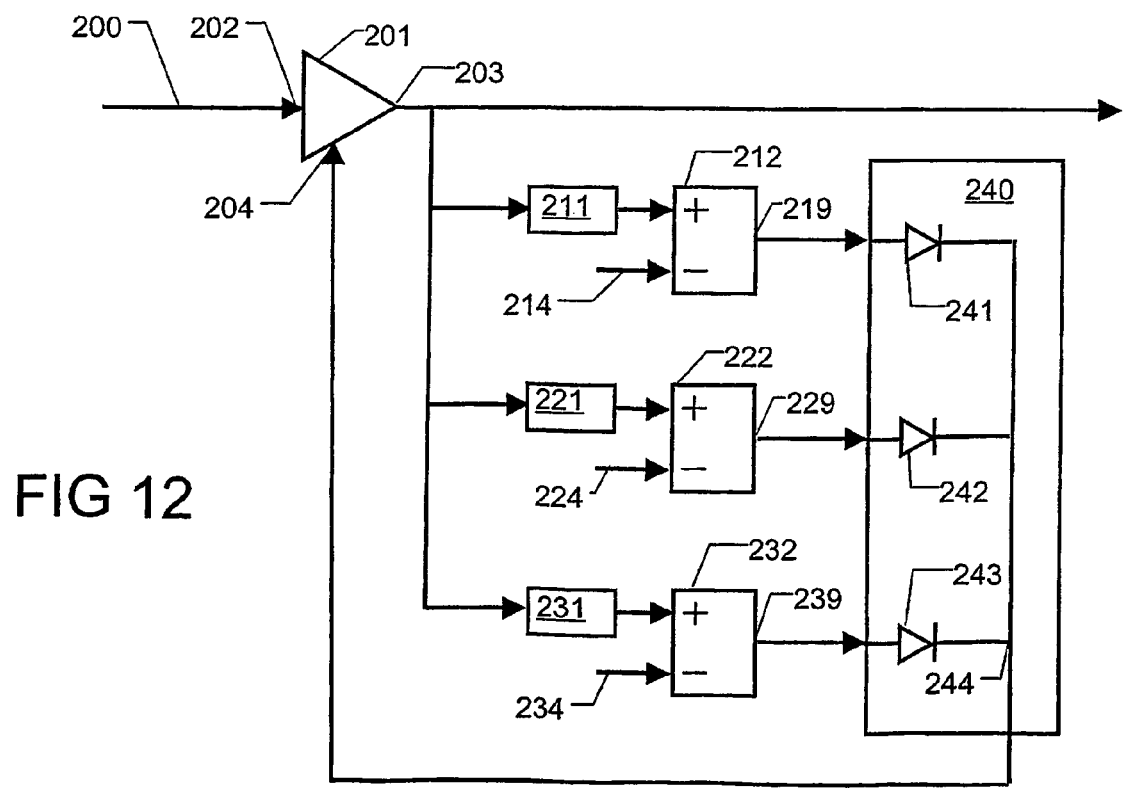
FIG. 12 shows a second embodiment of the amplifier circuit.

FIG. 12 shows an embodiment with three control units where each control unit comprises a level detector 211, 221, 231 which detects which level said output signal has and an integrator unit 212, 222, 232 which integrates the difference between the detected level and a predetermined desired value 214, 224, 234. The outputs 219, 229, 239 from the integrator units 212, 222, 232 are connected to the selector unit 240. Also in this case, the different control units are suitably arranged to sense different kinds of output signals. For example, one level detector may be adapted to sense signals with a relatively long pause between the pulses. Such a level detector may be arranged with a memory such that the level of a detected pulse is maintained as output signal from the level detector during a certain time.

The level of the signals may be defined in different manners depending on for which kind of signals the amplifier circuit is used. For example, the level may be an average value of the amplitude of the signal during a certain time interval. Alternatively, the level may be the maximum amplitude of the signal. According to a preferred embodiment, the level detectors may sense the peak-to-peak value of the signals.

As is symbolised with a + and − sign in FIG. 12, the integrator 212, 222, 232 integrates the difference between detected level and the desired value 214, 224, 234. The output signal of the integrator 212, 222, 232 thus increases as long as the detected level is higher than the desired value 214, 224, 234 and decreases if the detected level is lower than the desired value 214, 224, 234. For example, the amplifier unit 201 may be arranged such that a higher input signal on the control input 204 means a lower amplification and vice versa. The selector unit 240 selects the control signal which gives the lowest amplification, which according to this example means the highest control signal. According to a preferred embodiment, the selector unit 240 may comprise a plurality of diode units 241, 242, 243 connected in parallel. A diode unit may consist of a diode or of another unit which implements a diode function, for example a transistor connected such that the base corresponds to the anode of a diode and the emitter corresponds to the cathode of the diode. Each diode unit 241, 242, 243 has an input side arranged to receive a control signal from one of the control units 210, 220, 230, in this case thus from the integrators 212, 222, 232. The outputs from the diode units 241, 242, 243 are connected to a common point 244. The signal from this point is conducted to the input 204. Such a simple construction of the selector unit 240 functions if the input 204 is resistive such that always at least one of the diode Units 241, 242, 243 has a forward voltage.

If one of the control units is arranged to sense signals with longer pauses between the pulses, for example the so-called link-pulses, it may sometimes be desirable that this control unit does not control the amplification during normal operation conditions. This may be achieved if the desired value for the integrator unit of this control unit is higher than the desired value for the integrator unit of the other control unit or control units. Through this higher desired value it is also avoided that a too low amplification is the case when only the signal with longer pauses between the pulses controls the amplification, which for example is the case when no other signals are present.

Figure 13:
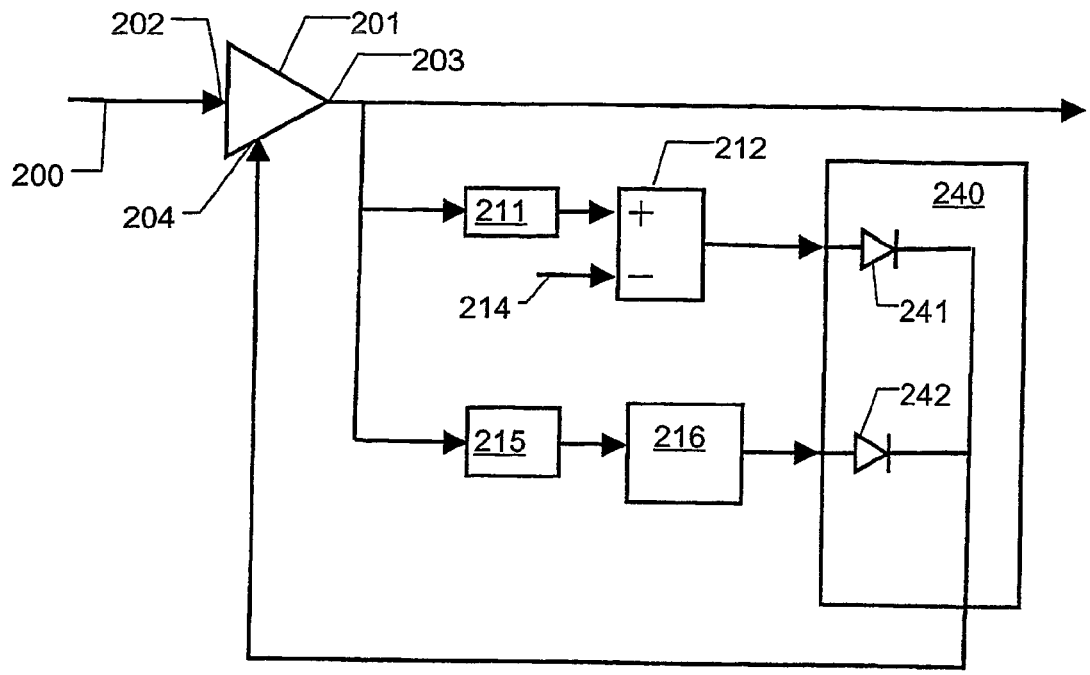
FIG. 13 shows a third embodiment of the amplifier circuit.

FIG. 13 shows an embodiment which comprises different kinds of control units. A first control unit comprises a level detector 211 and an integrator unit 212 as has been described above. The amplifier circuit comprises a second control unit which comprises a comparator unit 215, which senses if the output signal from the amplifier unit 201 exceeds a predetermined level, and a signal control unit 216 which has an output signal which, at least if a certain condition is fulfilled, changes in a first direction when the comparator unit 215 senses an output signal exceeding the predetermined level. The output signal from the signal control unit 216 is connected to the selector unit 240. Said first direction means a decreased amplification of the amplifier unit 201 if the signal from the signal control unit 216 is conducted to the amplifier unit 201. In order to give a concrete example, it may be assumed that the amplifier unit 201 is such that a higher level of the signal to the input 204 means a lower amplification. Furthermore, the above mentioned condition may be that the signal should have a frequency which exceeds a certain value, for example 10 Hz. This example could for example be used for sensing the above mentioned link-pulses. The comparator unit may for example sense if the amplitude of the pulses exceeds 1.2V. This means that if link-pulses with an amplitude over 1.2V are sensed and if these pulses arrive with a higher frequency than 10 Hz, then the output signal from the signal control unit 216 is increased. This means a lower amplification. As mentioned, the selector unit 240 always selects the amplification in accordance with the output signal from the control unit which gives the lowest amplification.

The signal control unit 216 may for example be implemented as a unit which has an output signal which increases as soon as the comparator unit 215 receives a pulse exceeding the predetermined level, but continuously or discretely decreases (has a negative ramp) if no such signals are received. This means, according to this example, that the signal control unit 216 delivers a control signal which corresponds to an increased amplification as long as the comparator unit 215 does not receive any pulses above the predetermined level. For example, it may be assumed that the negative ramp is 100 mV/s and that the increased level is 10 mV when a pulse exceeding the predetermined level is received by the comparator unit 215. This thus means that if such pulses are received with a frequency which is higher than 10 Hz, then the signal control unit 216 delivers a control signal which corresponds to a reduced amplification. If however such pulses are received with a frequency which is lower than 10 Hz, then the signal control unit 216 delivers a control signal which corresponds to an increased amplification.

Figure 14:
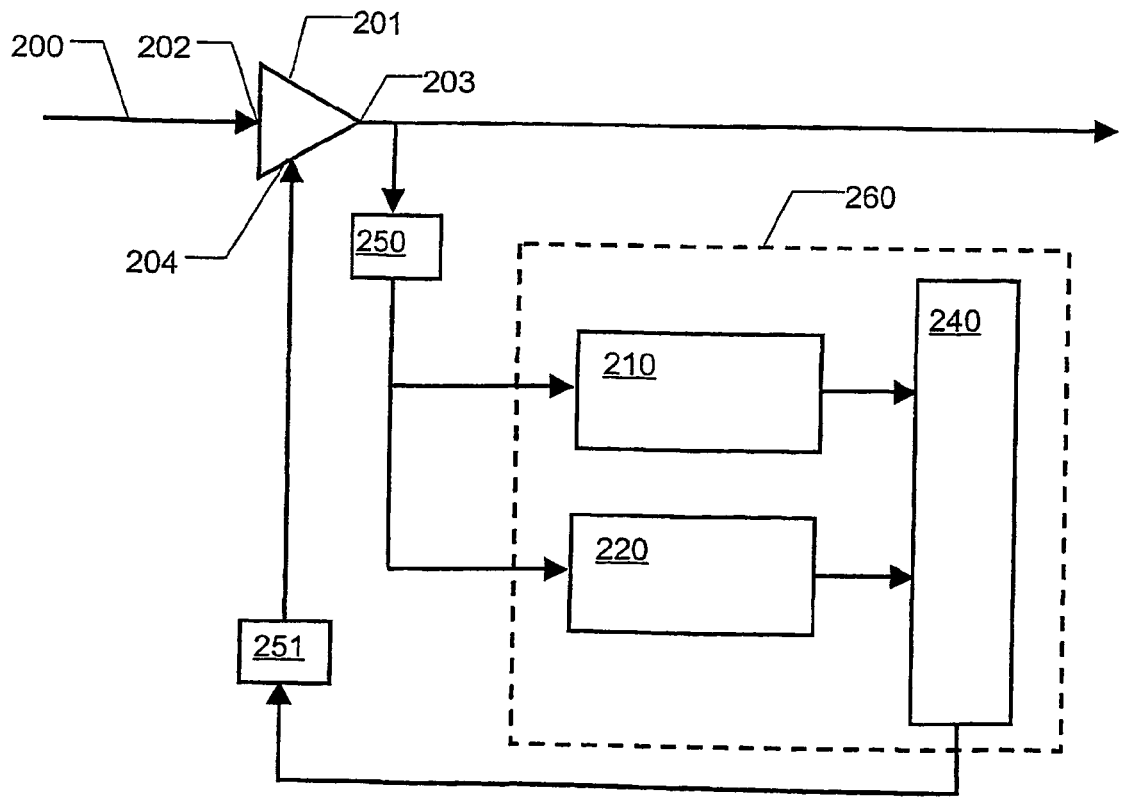
FIG. 14 shows a fourth embodiment of the amplifier circuit.

The control units 210, 220, 230 or parts of these control units and/or the selector unit 240 may also be implemented with the help of a programmable processor unit 260. FIG. 14 shows schematically an example of an amplifier circuit which comprises an A/D (analogue-digital) converter 250 which converts the output signal from the amplifier unit 201 to a digital signal. Furthermore, by 260 a processor unit is symbolised which treats this digital signal. The processor unit is arranged to form at least a part of the control units 210, 220, 230 and/or the selector unit 240. In the shown case, the whole control units 210, 220 and the selector unit 240 are formed by a processor unit 260. The amplifier circuit also comprises a D/A (digital-analogue) converter which converts an output signal from the processor unit 260 to an analogue form before this signal is conducted to the amplifier unit 201. This D/A converter is not necessary if the amplifier unit 201 may be controlled by a digital signal. It also conceivable that a certain electronic circuitry is present between the output 203 from the amplifier unit 201 and the A/D converter 250. For example, A/D conversion could also take place after possible level detectors. The whole control units do therefore not have to be implemented in the processor unit 260.

It should be noted that the amplifier circuit according to a preferred embodiment is arranged such that the amplification is limited such that it never exceeds a predetermined maximum level. This may for example be achieved in that the amplifier circuit is arranged such that a signal which corresponds to a maximum amplification is present at an input, suitably the input 204, of the amplifier unit 201, even if the output signal from the selector unit 240 corresponds to a higher amplification. According to an embodiment where a lower signal from the selector unit 240 means a higher amplification, this may for example be achieved in that the amplifier circuit is arranged such that always a minimum current (which corresponds to a maximum amplification) is conducted to the input 204. Alternatively, it is possible that the control units 210, 220, 230 are arranged such that the output signals from these control units are limited such that the amplification never exceeds a predetermined value.

Now embodiment of an optical input stage (below called "circuit") which may form part of the receiver unit RXA, RXB of the invention will be described.

Figure 15:
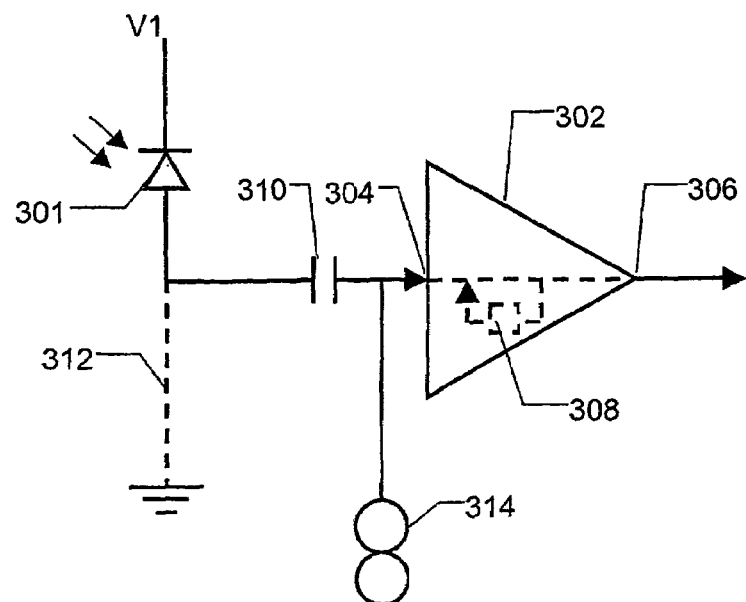
FIG. 15 shows schematically a simple embodiment of a circuit which may form part of the invention.

FIG. 15 shows such a circuit. The circuit comprises a light sensitive member 301, for example a photo-diode. In the shown example, the cathode of the photo-diode is connected to a bias voltage V1. The anode of the photo-diode 301 is connected to a filter unit 310, in this case a capacitor, which in its turn is connected to a first input 304 of an amplifier component 302. The capacitor 310 prevents a direct current from the photo-diode 301 from reaching the first input 304. The hatched line. 312 symbolises that such a direct current is conducted away from the photo-diode 301. The amplifier component 302 has a first output 306 where an amplified output signal is delivered. The amplifier component 302 is of the kind which does not have any special input intended for controlling the amplification of the amplifier component 302. Such an amplifier component 302 may suitably be of the kind which has been described initially above. Such a component 302 may comprise an internal amplification controlling unit 308. Such an amplification controlling unit 308 may, but does not have to, comprise a feedback control loop.

A control unit 314 is connected to the first input. According to the shown example, the control unit 314 constitutes a variable current generator. With this current generator 314 the current into the first input 304 may be controlled. The current generator 314 may thus be used for influencing the amplification of the circuit.

It should be noted that the figures only show preferred embodiments. It is of course also possible that for example the polarity of the circuit may be the opposite. With reference to FIG. 15, for example the photo-diode 301 could be reversed and V1 could be a negative voltage. The control unit 314 would in this case control a current out from the first input 304.

Figure 16:
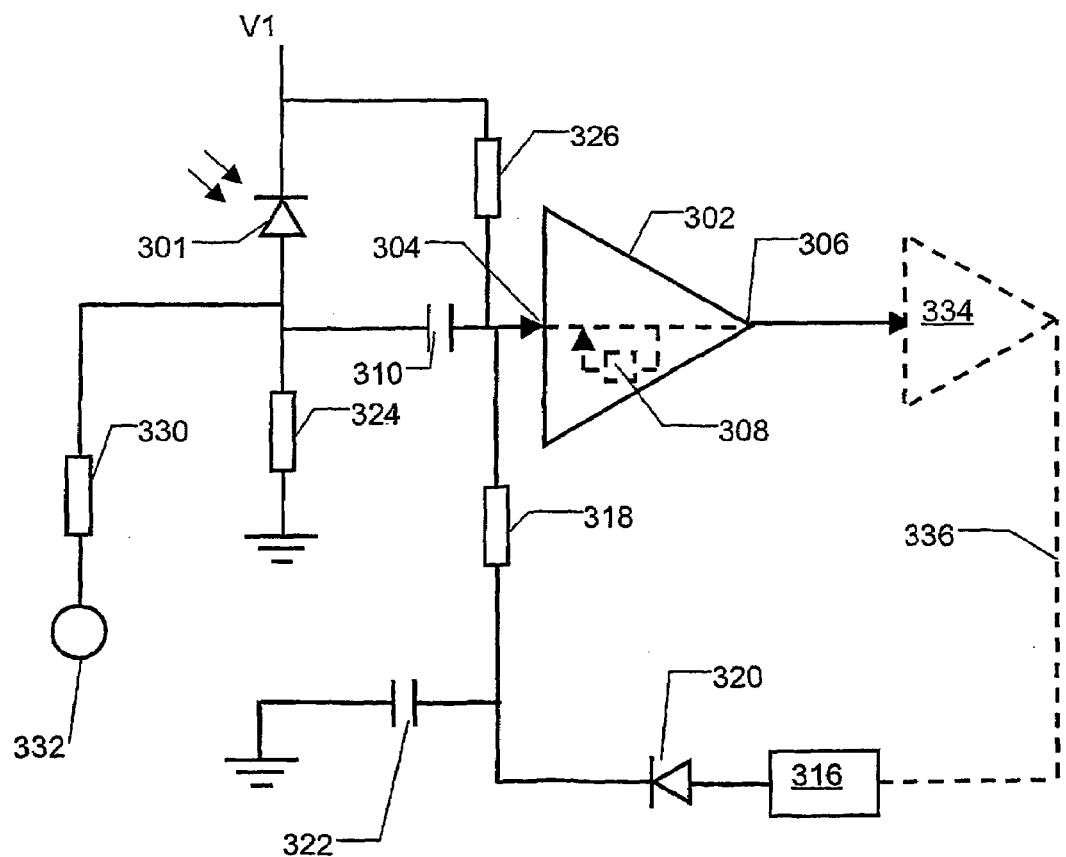
FIG. 16 shows another embodiment of the circuit.

FIG. 16 shows a further embodiment of the circuit. The corresponding parts as in FIG. 15 have the same reference signs as in FIG. 15. These parts will therefore not be described more closely in connection with FIG. 16. According to FIG. 16, the control unit constitutes a variable amplification-controlling voltage unit 316 connected to a first resistance 318 which in its turn is connected to the first input 304. A second diode unit 320 is arranged for preventing an incorrect current direction, i.e. in this case a current out from the first input 304. A filter member 322, in this case a capacitor, is arranged to filter out possible disturbances which are superposed on the amplification-controlling voltage.

A second resistance 324 is connected to the anode of the photo-diode 301 for conducting away a direct current. According to the shown embodiment, the amplifier component 302 is of the kind where a low current into the first input 304 means a high amplification. In order to ensure that a certain current is always present at the first input 304, a third resistance 326 is arranged between the bias voltage V1 and the first input 304. This third resistance 326 thus limits the amplification of the circuit.

It may be interesting to measure the photo current through the photo-diode 301. The photo current is proportional to the voltage over the second resistance 324. However, it may be unsuitable to measure this voltage since such a measurement could lead to disturbances in a sensitive part of the circuit. In order to avoid this problem, a fourth resistance 330 is connected to the anode of the photo-diode 301. This fourth resistance is suitably a resistance with a high resistance. A measurement device 332 may thus be connected to this fourth resistance 330.

334 symbolises a circuit which follows after the amplifier component 302. This circuit 334 may comprise an amplifier. The hatched line 336 symbolises that a feedback from this circuit 334 may be arranged for influencing the variable voltage which is symbolised by the unit 316.

It will now briefly be described how the different parts of the invention which have been described above are arranged in the transmitter-receiver device (A, B) which is shown in FIG. 4.

As has been mentioned above, the above described transmitter circuit may form part of the transmitter unit TXA (or TXB). With reference to for example FIG. 7, it may thus be noted that the twisted pair 30 of conductors corresponds to the line 133 in FIG. 4. The fibre 35 in FIG. 7 corresponds to the fibre F2 in FIG. 4. The signal in at the input 103 in FIG. 4 may correspond to the voltage $V_B$ in FIG. 7. The voltage $V_B$ may thus be switched on or switched off with the help of the supervising unit CUA in FIG. 4. Thereby also the optical power which is transmitted on the fibre F2 may be switched on and switched off. The sixth output 115 in FIG. 4 does not have any direct correspondence in FIG. 7. The signal at the output 115 may for example be controlled by an arbitrary level detector which detects if a balanced input signal is present at the pair 30 of conductors. A sufficiently strong balanced signal means that the transmitter unit TXA receives an information carrying signal at the input 143.

With reference to FIGS. 11 to 14 it may be noted that the optical conductor 200 corresponds to the fibre F1 in FIG. 4. The line 131 in FIG. 4 corresponds to the line from the output 203 in FIGS. 11 to 14.

As has been mentioned above, the circuit according to FIGS. 15 and 16 may form part as an input stage in the amplifier unit 201 in FIGS. 11 to 14. With reference to for example FIG. 16, it may thus be noted that the light which falls on the photo-diode 301 corresponds to the light from the fibre F1 in FIG. 4. The input 204 in FIGS. 11 to 14 may be said to correspond to an input which controls the current generator 314 in FIG. 15 or to for example the input to the diode unit 320 in FIG. 16. The signal which controls the amplification in at the input 204 thus corresponds to a signal to the current generator 314 in FIG. 15, alternatively a signal at the line to the diode unit 320 in FIG. 16, which signal is conducted to the input 304. The signal from the output 101 in FIG. 4, which signal indicates that the receiver unit RXA receives light, may correspond to a signal from the measurement device 332 in FIG. 16. The measurement device 332 may for example be a comparator which detects if the voltage over the resistance 330 is above a predetermined value. The circuit 334 in FIG. 16 may be thought to comprise an amplifier unit, which may form part of the amplifier unit 201 according to FIGS. 11 to 14. Also a part of the feedback loop which is shown in FIGS. 11 to 14 may be thought to form part of the circuit 334 in FIG. 16. The diode unit 320 in FIG. 16 may for example constitute diode units, connected in parallel, which form part of the selector unit 240 according to FIGS. 11 to 14. Of course, the diode unit 320 may also be a separate diode unit.

It should be noted that the output 111 in FIG. 4, at which output a signal is present which indicates whether the receiver unit RXA receives an information carrying signal via the first optical fibre F1, does not have any direct correspondence in the other figures. This signal may be obtained in different manners. For example, the level of the signal from the selector unit 240 in FIGS. 11 to 14 may be detected. For example, if a low level at this signal means a high amplification, the following may be the case: if the level is below a predetermined value, which corresponds to a high amplification, then it is assumed that no information carrying signal, i.e. no modulated signal, is received at the input 202, since if such an information carrying modulated signal where the case, the amplification determined by the selector unit 240 would not be so high.

It should be noted that when in this document signals are mentioned, these signals may be balanced, i.e. differential, even if they are not always described in this way. Particularly suitable is that the information carrying signals at the lines 131 and 133 in FIG. 4 are differential.

The invention is not limited to the shown embodiments but may be varied within the scope of the annexed claims.

The invention claimed is:

1. A transmitter-receiver device comprising
   a receiver unit arranged to via a first optical conduction path receive light and optical signals and comprising a first output which indicates whether the receiver unit receives light,
   a transmitter unit arranged to on a second optical conduction path transmit light and optical signals and comprising a first input which controls whether the transmitter unit shall transmit light,
   a supervising unit with a second input connected to said first output and a second output connected to said first input and arranged to via said second output prevent the transmitter unit from continuously transmitting light when the supervising unit via the second input detects that the receiver unit does not receive light, wherein the supervising unit is arranged to, when it detects that the receiver unit does not receive light, change to a test mode where the supervising unit controls the transmitter unit to intermittently transmit short light pulses on said second optical conduction path, wherein the supervising unit is arranged with a third out-put where a status signal indicates whether the transmitter-receiver device is in said test mode, wherein the transmitter unit comprises a transmitter circuit comprising a light source and arranged to operate said light source to transmit optical communication signals in response to electric input signals from a first and a second circuit point between which circuit points a balanced electric input signal is intended to be present, wherein said transmitter circuit comprises a first circuit branch which extends from said first point via a third point to at least a fourth point and wherein said transmitter circuit comprises a second circuit branch which extends from said second point via a fifth point to at least a sixth point, wherein said light source is connected between said third and fifth points, wherein the components which are positioned on said first and second circuit branches are chosen such that the transmitter circuit is formed with a symmetry which is such that under normal operation conditions a balanced drive voltage is the case between said third and fifth points, which balanced drive voltage only depends on the voltage difference between said first and second points, wherein also the modulation current through the light source only depends on said voltage difference.

2. A transmitter-receiver device according to claim 1, wherein the supervising unit is arranged such that when the transmitter-receiver device is in said test mode, the time between said light pulses is less than 1 s, preferably less than 0.1 s.

3. A transmitter-receiver device according to claim 1, wherein the receiver unit is arranged with a fourth output which is connected to the supervising unit, at which fourth output a signal is the case which indicates whether the receiver unit, via the first optical conduction path, receives an information carrying input signal, wherein the supervising unit has a fifth output with a status signal which depends both on the status of the signal of said third output and the status of the signal from said fourth output.

4. A transmitter-receiver device according to claim 1, wherein the transmitter unit is arranged with a sixth output which is connected to the supervising unit at which sixth output a signal is the case which indicates whether the transmitter unit receives an electric information carrying input signal, wherein the supervising unit has a seventh output with a status signal which depends both on the status of the signal of said third output and the status of the signal from said sixth output.

5. A transmitter-receiver device according to claim 1, wherein said first and second circuit branches are formed with a mirrored symmetry, such that the electric properties of the components which are arranged on said first circuit branch correspond to the same electric properties of the components which are arranged on said second circuit branch.

6. A transmitter-receiver device according to claim 1, arranged such that a first constant voltage is the case at said fourth point and a second constant voltage is the case at said sixth point.

7. A transmitter-receiver device according to claim 1, wherein all the components which are arranged on said first and second circuit branches are passive components.

8. A transmitter-receiver device according to claim 1, wherein the receiver unit comprises an amplifier circuit comprising at least:
   an amplifier unit arranged to receive an input signal and to influence the amplification of this input signal and to transmit an output signal which is intended to lie at a desired level,
   a first control unit arranged to detect said output signal and to deliver a first control signal for controlling the amplification of said amplifier unit,
   a second control unit arranged to sense said output signal and to deliver a second control signal for controlling the amplification of said amplifier unit,
   a selector unit arranged to receive said first and second control signals and connected to said amplifier unit, wherein the selector unit is arranged to control the amplification of the amplifier unit in accordance with that one of said first and second control signals which gives the lowest amplification.

9. A transmitter-receiver device according to claim 8, wherein the first control unit is specially arranged to sense a first kind of output signal and wherein the second control unit is specially arranged to sense a second kind of output signal.

10. A transmitter-receiver device according to claim 9, wherein the first control unit is specially arranged to sense an output signal which is continuous or which comprises pulses with a relatively short pause between the pulses and wherein the second control unit is specially arranged to sense an output signal which comprises pulses with relatively long pauses between the pulses.

11. A transmitter-receiver device according to claim 1, wherein the receiver unit comprises a circuit for receiving an optical signal, which circuit comprises:
- a light sensitive member arranged to receive an optical input signal and to deliver an electric signal in response to the received optical signal,
- an amplifier component with a first input arranged to receive the electric signal from the light sensitive member, wherein the amplifier component is arranged to influence the amplification of the electric signal and to deliver an amplified output signal via a first output, wherein the amplifier component does not have any further input specially intended for controlling the amplification of the amplifier component,
- a filter unit arranged to prevent a possible direct current in the electric signal from the light sensitive member from reaching said first input, and
- a control unit connected to said first input and arranged to control the power of the electric signal at this first input for thereby influencing the power of said output signal.

12. A transmitter-receiver device according to claim 11, wherein said light sensitive member is arranged such that a possible direct current from the light sensitive member would be directed into said amplifier component via the first input if said filter unit were not arranged to prevent such a direct current, wherein the control unit is arranged to control the power of an electric current in a direction in via the first input.

13. A transmitter-receiver device according to claim 11, wherein said light sensitive member comprises a first diode unit with a first connection connected to a bias voltage and a second connection connected to said filter unit, which filter unit is connected to the first input.

14. A transmitter-receiver device according to claim 11, comprising an amplification limiting unit connected to said first input.

15. A transmitter-receiver device according to claim 11, comprising a second diode unit connected to said control unit for preventing incorrect current direction to/from the first input.

16. A communication system comprising a first transmitter-receiver device according to claim 1, and a second transmitter-receiver device according to to any of the preceding claims, and a first and a second optical conduction path which connect the first and the second transmitter-receiver device to each other, wherein the first optical conduction path is connected to the receiver unit of the first transmitter-receiver device and the transmitter unit of the second transmitter-receiver device, wherein the second optical conduction path is connected to the receiver unit of the second transmitter-receiver device and the transmitter unit of the first transmitter-receiver device.

17. A communication system according to claim 16, comprising a network management system, wherein at least one of said first and second transmitter-receiver devices is connected to the network management system.

18. A communication system according to claim 17, wherein at least said third output of said at least one transmitter-receiver device is connected to the network management system.

19. A communication system according to claim 18, wherein at least said at least one transmitter-receiver device is arranged such that also said fifth and seventh outputs are connected to the network management system.

20. A communication system according to claim 16, arranged such that said third, fifth, and seventh outputs of the first transmitter-receiver device, except for possibly during a short time delay, have the same status as the third, seventh, and fifth, respectively, outputs of the second transmitter-receiver device.

* * * * *